(12) United States Patent
Hirsch

(10) Patent No.: US 6,442,193 B1
(45) Date of Patent: Aug. 27, 2002

(54) COMBINING SUB-CHIP RESOLUTION SAMPLES IN ARMS OF A SPREAD-SPECTRUM RAKE RECEIVER

(75) Inventor: Olaf Josef Hirsch, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/281,350

(22) Filed: Mar. 30, 1999

(51) Int. Cl.[7] .................. H04B 1/707; H04B 7/216; H04L 27/30
(52) U.S. Cl. .................. 375/147; 370/342; 375/150
(58) Field of Search ............... 375/142, 144, 375/147, 148, 150, 343, 346, 347, 349; 370/320, 335, 342, 441

(56) References Cited

U.S. PATENT DOCUMENTS

| | | | |
|---|---|---|---|
| 5,648,983 A | | 7/1997 | Kostic et al. ............... 375/206 |
| 5,671,221 A | * | 9/1997 | Yang ........................... 370/320 |
| 5,719,899 A | * | 2/1998 | Thielecke et al. ........... 375/144 |
| 5,818,866 A | | 10/1998 | Wilk ............................ 375/200 |
| 5,926,503 A | * | 7/1999 | Kelton et al. ................ 375/148 |

OTHER PUBLICATIONS

TIA/EIA/IS–95–A Interim Standard, May 1995, pp. 6–7 to 6–11, 6–17, 6–18M 6–22, to 6–26, 7–1 to 7–6, 7–16 to 7–20, and 7–22 to 7–24.

By J.G. Proakis, "Digital Communications", Pub. McGrawHill 1989, pp. 862–872.

* cited by examiner

Primary Examiner—Betsy L. Deppe
(74) Attorney, Agent, or Firm—Gwenaelle Le Pennec

(57) ABSTRACT

A spread spectrum communication device having a channel estimator and a rake receiver with a number of rake fingers. The spread spectrum communication device is used in a direct sequence spread spectrum, code division multiple access system. In the spread spectrum system, symbols are spread by a pseudo-noise reference sequence, with a chip rate substantially higher than a symbol rate of the symbols, the spread symbols are modulated onto a carrier, and the carrier modulated signals are transmitted over an air-interface. The air-interface tends to produce multipath components of the transmitted signal. The spread spectrum communication device receives the multipath components, and demodulates symbols intended for it, by de-spreading the received signals with a locally generated pseudo-noise reference sequence, and coherently adding multipath resolved components intended for it. After carrier demodulation of the received signals, the spread spectrum communication device samples the demodulated signals with a sampling rate exceeding the chip rate so that samples at a sub-chip resolution are obtained. Individual rake fingers coherently combine multipath components resolved at a sub-chip resolution, whereas separate rake fingers process multipath components spaced apart more than one chip. The rake receiver coherently combines the sub-chip resolved multipath components as coherently added in the individual rake fingers, and the multipath components spaced apart more than one chip.

10 Claims, 5 Drawing Sheets

COMBINING SUB-CHIP RESOLUTION SAMPLES IN ARMS OF A SPREAD-SPECTRUM RAKE RECEIVER

BACKGROUND OF THE INVENTION

1. Field of the Invention

The present invention relates to a spread spectrum communication device for use in a direct sequence spread spectrum, code division multiple access system, wherein a symbol is spread by a pseudo-noise reference sequence with a chip rate which is substantially greater than a symbol rate of said symbol, so as to form a spread spectrum signal, said spread spectrum signal being modulated onto a carrier and being transmitted over an air interface tending to produce multipath components of said modulated spread spectrum signal.

The present invention further relates to a receiving method for use in a direct sequence spread spectrum, code division multiple access system.

2. Description of the Related Art

In the U.S. Pat. No. 5,648,983 a so-called rake receiver is disclosed for use in a direct-sequence spread spectrum (DSSS), code-division multiple access (CDMA) system. Said rake receiver, which in principle is a matched filter type of digital symbol receiver, comprises a plurality of so-called rake fingers for correlating delayed replica of a received signal with a reference sequence such as a locally generated pseudo-noise (PN) sequence. The received signal is a data signal, which is spectrally, de-spread by the same pseudo-noise sequence as generated in a transmitter. The rake fingers are coupled to a tapped delay line of which the delay between consecutive taps is less than a duration of an element of the pseudo-noise sequence, such an element being a so-called chip. Output signals of said rake fingers are combined so as to obtain a coherently added signal from signals that have propagated through multipath channels and that have undergone different propagation delays, said coherently added signal being dumped to a symbol detector at a rate of the symbols to be detected. In principle, a total delay of said tapped delay line is in the order of the delay spread of the different propagation delays. A sampler provides samples of the received signal to said tapped delay line, sampling being performed with sub-chip resolution, i.e., at a sampling rate greater than a chip rate of the PN-sequence. A channel estimator, being coupled to the rake receiver, actually resolves multipath components spaced apart closer than a chip interval, by estimating a channel impulse response with high resolution using de-convolution techniques. Before combining the output signals of the rake fingers are multiplied by respective estimates of the signal phase for respective paths, said estimates being obtained by a phase estimator. Such a rake receiver is thus capable of resolving multipath signals that have path components spaced closer than one chip of the reference sequence, though at the cost of a complex receiver structure with a great number of rake fingers.

In the U.S. Pat. No. 5,818,866, a method for use in a CDMA rake receiver is disclosed for selecting multiple propagation delays for the reception of messages transmitted in a spread spectrum radio communication system. The rake receiver comprises a number of reception arms or fingers. Each finger provides for the reception of the signal along a propagation path identified by a particular delay, said delays being estimated by a channel estimator. Each finger comprises a correlator formed by a buffer memory, a complex multiplier, and a summation-accumulator, the buffer memory being sized so as to store a number of samples of the received signal, and a buffer length of a number of samples corresponding to an expected maximum delay spread in the system. In write mode, the buffer acts like shift register, whereas in read mode, the buffer is read out at an address corresponding to a delay estimated by the channel estimator. The channel estimator comprises a sliding correlator determining correlation between the received signal and a reference PN-sequence. In said method, a received signal is sampled at a sampling rate greater than the chip rate of the spreading sequences so that the channel estimator can provide estimations of the complex amplitude of the response of the propagation channel for relative propagation delays at sub-chip resolution. In said method, delays for said fingers are selected from a first and a second list, respectively. The first list contains delays corresponding to central samples of multipath correlation peaks, whereas the second list contains delays corresponding to samples which are neighbors of the central samples, the samples being above a given selection threshold. Further in said method, if the number of delays in said first list is greater than the number of arms of the rake receiver, delays of the rake arms are selected from the first list for which evaluated energies are largest. If there is an insufficient number of delays in the first list to set the delays in all rake arms, additional delays are selected from the second list for which the evaluated energy is above the selection threshold. As in said U.S. Pat. No. 5,648,983, so-called multipath diversity gain is obtained by coherently adding output signals from the rake arms. In the method as disclosed in said U.S. Pat. No. 5,818,866, the number of rake arms or fingers is thus constant, all arms being assigned to delays corresponding to samples of the received signal with an energy above said given selection threshold.

Rake receivers as described in said U.S. Pat. No. 5,648,983 and No. 5,818,866 are so-called baseband direct-sequence spread-spectrum receivers, usually implemented as an integrated circuit (IC). From a cost point of view it is highly desirable to keep the chip area of such an IC as small as possible. Because such receivers are usually part of a portable communications transceiver supplied by a battery, it is further desirable that the receiver has low power consumption so that battery power is not exhausted too soon.

In the TIA/EIA Interim Standard TIA/EIA/IS-95-A, May 1995, pages 6-7 to 6-11, 6-17, 6-18, 6-22 to 6-26, 7-1 to 7-6, 7-16 to 7-20, and 7-22 to 7-24, requirements for so-called IS-95 mobile radio station and base station operation are given so as to be able to transmit and receive CDMA direct sequence spread spectrum signals at a radio interface. On page 6-7, reverse CDMA channels are described for reception by a radio base station. On page 6-8, in FIG. 6.1.3.1-2., a reverse CDMA channel structure is given. On page 7-2, in FIG. 7.1.3.1-1., an overall structure of forward CDMA channels is given for reception by a mobile base station. The reverse CDMA channel is composed of access channels and reverse traffic channels, all of these channels sharing the same frequency radio channel using CDMA direct-sequence CDMA techniques, such a radio channel having a bandwidth of 1.23 MHz. Each traffic channel is identified by a distinct user long PN-code sequence. Data transmitted on a reverse CDMA channel is grouped into 20 ms frames. All data on the reverse CDMA channel, after convolution encoding and interleaving, is modulated by a 64-ary orthogonal modulation, and direct-sequence spread prior to transmission at a carrier. As can be seen in FIG. 6.1.3.1.-2., direct-sequence spreading is done using by modulo-2 addition of Walsh chips and said user long code sequence, such direct sequence spreading being followed by quadrature spreading using an in-phase and a quadrature pseudo-noise sequence, respectively, the quadrature sequences being periodic with period $2^{15}$ chips. The spread chips are baseband filtered before being modulated onto a carrier. After interleaving, the code symbol rate is constant, in the IS-95-A system 28,800 sps. Six code symbols are modulated as one of 64 modulation symbols for transmission. As described on page 6-17, the modulation symbol is one of 64 mutually orthogonal waveforms generated using so-called Walsh functions. The PN chip rate is 1.2288 Mcps, each Walsh chip being spread by four PN chips. The long code is unique to a mobile station, whereas Walsh orthogonal modulation is applied to distinguish CDMA channel transmitted at a given radio frequency. In the forward CDMA channel structure, CDMA code channels such as a pilot channel, a synchronization channel, paging channels, and a number of forward traffic channels are defined, said code channels being orthogonally spread by an appropriate Walsh function, followed by direct sequence spreading using a quadrature pair of PN sequences at a fixed chip rate of 1.2288 Mcps. The spreading of the forward channel is done differently than in the reverse channel. Code channel zero is usually assigned to the pilot channel so that mobile can easily find the pilot channel, 75 repetitions of the pilot channel occurring every 2 seconds. Pilot channels are unmodulated channels, different pilot channels being distinguished by different timing offsets within a master clock in the CDMA system. Both on the forward and the reverse channel, after baseband filtering, quadrature signals are mapped into four phases of the carrier.

In the handbook, "Digital Communications", J. G. Proakis, McGraw-Hill Book Company, 1989, pp. 862–872, time synchronization of spread spectrum systems is described, such time synchronization being split in two phases, an initial acquisition phase and a tracking phase after signal timing has been initially acquired. Time synchronization has to be so accurate that the PN-sequence is time synchronized to within a small fraction of the chip interval. On page 863, a sliding correlator is described to establish initial synchronization. On page 867, in FIG. 8.5.5, a delay-locked loop is shown for PN sequence tracking, such DLL tracking being described on pages 868 and 869.

SUMMARY OF THE INVENTION

It is an object of the invention to provide a spread spectrum communication device in which, at a sub-chip resolution, multipath components of a received modulated spread spectrum signal are efficiently combined, and in which, preferably, a signal-to-noise ratio in a received signal is optimized.

It is another object of the invention to provide a spread spectrum communication device in which power is saved if a number of resolved multipath components, at chip resolution, is less than a number of rake fingers in a rake receiver comprised in the spread spectrum communication device.

It is still another object of the invention to provide a spread spectrum communication device to selectively provide sub-chip resolved multipath components to single fingers of the rake receiver.

It is yet another object of the invention to estimate an average phase on sub-chip resolved multipath components to be supplied to a single rake finger.

In accordance with the invention, a spread spectrum communication device is provided for use in a direct sequence, code division multiple access system, wherein a symbol is spread by a pseudo-noise reference sequence with a chip rate which is substantially greater than a symbol rate of said symbol, so as to form a spread spectrum signal, said spread spectrum signal being modulated onto a carrier and being transmitted over an air interface tending to produce multipath components of said modulated spread spectrum signal, said spread spectrum communication device comprising:

a receiver front-end means for receiving said modulated spread spectrum signal;

a carrier demodulation means for demodulating said received modulated spread spectrum signal;

a sampling means for obtaining samples from said demodulated spread spectrum signal, said sampling means sampling having a sampling rate exceeding said chip rate;

a channel estimator for estimating from said samples, with a sub-chip resolution, of channel characteristics of said multipath components, and for determining of local maximums in said channel characteristics, and, within a chip period, of sample locations corresponding to said local maximums;

a rake receiver, said rake receiver being coupled to said channel estimator, receiving said samples, and comprising a plurality of receiver branches, each of said receiver branches comprising:

a down-sampler for sampling down said samples, on the basis of said determined sample locations, and a correlation means for correlating said down-sampled samples with a locally generated pseudo-noise reference sequence so as to generate correlation values; said rake receiver further comprising:

combining means for weightedly combining said correlation values; and decision means for deciding about a received symbol value, on the basis of said weightedly combined correlation values.

Because of combining sub-chip resolved multipath components in single arms of the rake receiver, typically, at the same signal-to-noise ratio of a combined signal, the rake receiver has fewer arms than known rake receivers. When implementing the spread spectrum communication device of the present invention in an integrated circuit, thus a reduced integrated circuit area can be obtained. Such an integrated circuit can be manufactured at reduced costs.

Preferably, power to unused rake fingers is switched off.

DESCRIPTION OF THE PREFERRED EMBODIMENT

Figure 1:
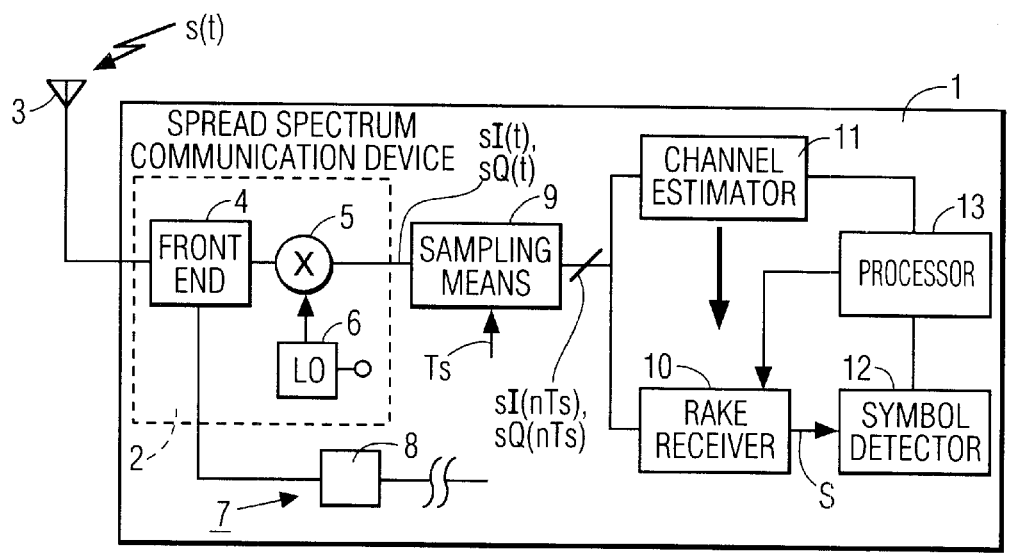
FIG. 1 is a block diagram of a spread spectrum communication device according to the present invention.

FIG. 1 is a block diagram of a spread spectrum communication device 1 according to the present invention. The spread spectrum communication device 1 is used in a direct sequence, code division multiple access system, wherein a symbol to be transmitted to the spread spectrum communication device 1 is spread by a pseudo-noise reference sequence with a chip rate which is substantially greater than a symbol rate of the symbol, so as to form a spread spectrum signal. Such a spread spectrum signal is modulated onto a carrier and is transmitted over an air interface tending to produce multipath components of the spread spectrum signal. Spread spectrum systems are well known in the art. A known spread spectrum system is a narrow band spread spectrum system as described in said TIA/EIA Interim Standard TIA/EIA/IS-95-A. Other spread spectrum systems are broad band spread spectrum systems currently under standardization in various countries throughout the world. The spread spectrum communication device 1 receives a modulated spread spectrum signal s(t). In the spread spectrum communication device 1 according to the present invention, received multipath components of the transmitted modulated spread spectrum signal s(t) are resolved at sub-chip resolution. The spread spectrum communication device 1 comprises receiver front-end means 2 coupled to an antenna 3 receiving the modulated spread spectrum signal s(t). The front end means 2 comprises a front end 4 for filtering and amplifying the received signal s(t), and carrier demodulation means in the form of a mixer 5 coupled to a local oscillator 6 for demodulating the received signal s(t). Although, in principle, the spread spectrum communication device 1 can be a unidirectional device only receiving the signal s(t), typically the device 1 is a bi-directional communication device. Then, the spread spectrum communication device 1 further comprises a transmitter branch 7 of which a power amplifier 8 is shown. The transmitter branch 7 can be arranged so as to generate a spread spectrum signal as described in said TIA/EIA Interim Standard TIA/EIA/IS-95-A. The mixer 5 provides a demodulated spread spectrum signal, in the form of quadrature base band signals sI(t) and sQ(t), to a sampling means 9 for obtaining quadrature base band samples sI(nTs) and sQ(nTs) from the signals sI(t) an sQ(t), t being time, n being an integer, and 1/Ts being a sampling rate exceeding the chip rate of the received signal s(t), a chip being a basic element of the pseudo-noise reference sequence with which the symbol to be transmitted was spread. The spread spectrum device 1 can retrieve the symbols or the bits intended for it by correlating the samples with a locally generated pseudo-noise sequence which is the same as the pseudo-noise reference sequence with which the symbol was transmitted. In order to perform such a correlation, and further to combine multipath components of the received modulated signal intended for it, the spread spectrum communication device 1 comprises a rake receiver 10 and a channel estimator 11. The channel estimator 11 estimates channel characteristics of the multipath components intended for it from the samples sI(nTS) and sQ(nTS), at sub-chip resolution, and provides information to branches of the rake receiver 10 as to which samples to process, from the stream of samples sI(nTs) and sQ(nTs), such information being indicated in FIG. 1 with a bold arrow and to be described in the following. The channel characteristics are represented by correlation results, within chip periods the channel estimator 11 determining local maximums of such correlation results and corresponding sample positions. The spread spectrum communication device 1 further comprises a symbol detector 12, and a processor 13 coupled to the rake receiver 10, the channel estimator 11, and the symbol detector 12.

Figure 2:
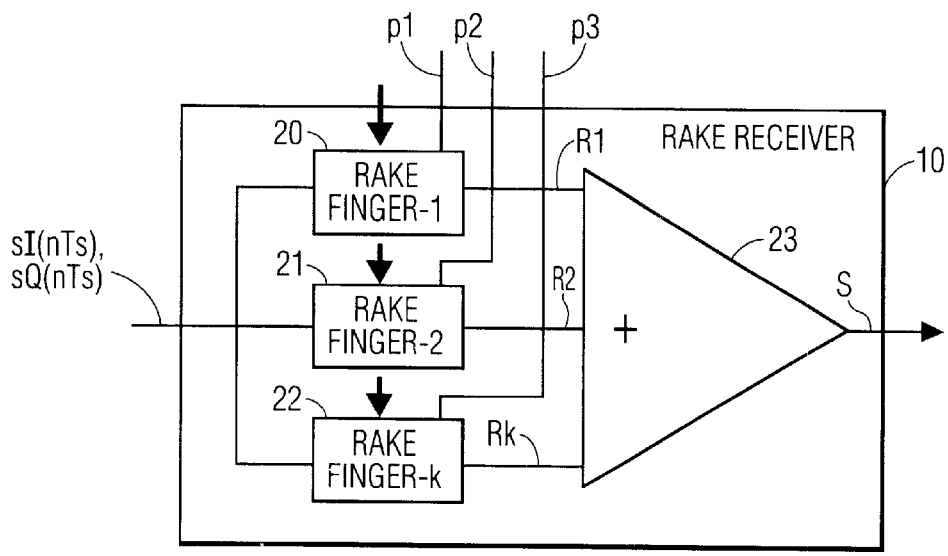
FIG. 2 is a block diagram of a rake receiver in a spread spectrum communication device according to the present invention.

FIG. 2 is a block diagram of the rake receiver 10 in the spread spectrum communication device 1 according to the present invention. The rake receiver 10 comprises a plurality of receiver branches, k rake fingers, k being an integer. Shown are rake finger 20, 21, and 22. Output signals R1, R2, . . . , Rk of the respective rake fingers 1, 2, . . . , k are diversity combined in the diversity combiner 23 so as to form a multipath received diversity combined signal S. The processor 13 can control power to the individual rake fingers to be switched off, so that power to unused rake fingers can be switched off. To this end, power control lines p1, p2, and p3 are provided. The bold arrows indicate information from the channel estimator 11, as described in relation to FIG. 1. The information includes synchronization information to synchronize pseudo-random sequences to be supplied to the rake fingers 20, 21, and 22 with the pseudo-random reference sequence implicitly being present in the received signal s(t). In a spread spectrum system according to said TIA/EIA Interim Standard TIA/EIA/IS-95-A, a reference sequence that is repetitive after $2^{15}$ chips determines synchronization.

Figure 3:
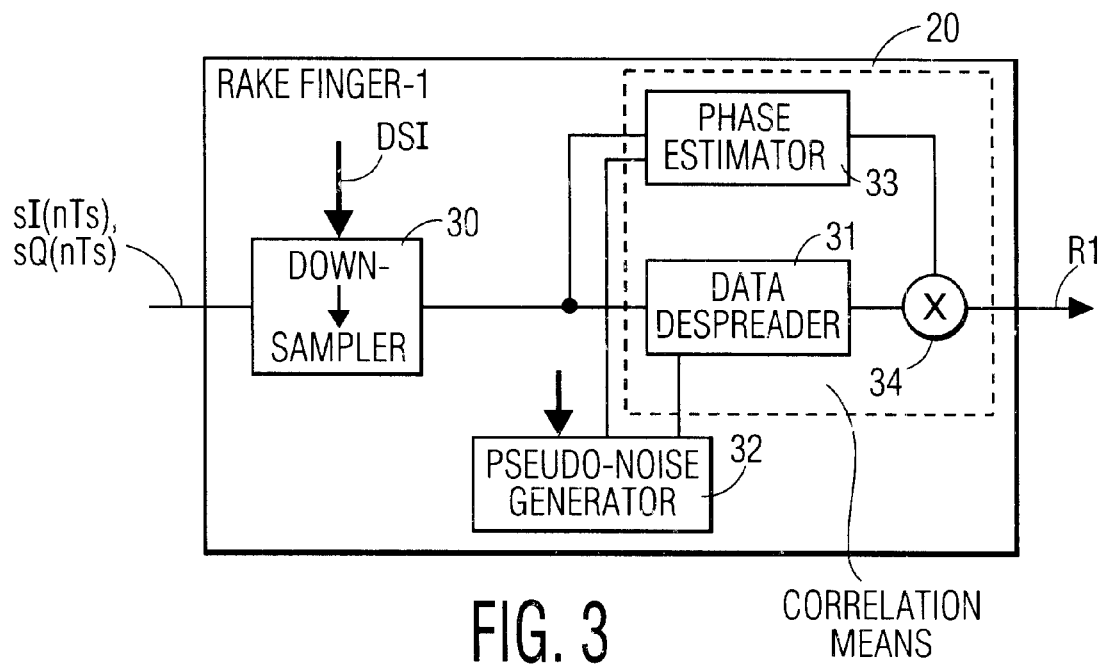
FIG. 3 shows a rake finger in a rake receiver according to the present invention.

FIG. 3 shows the rake finger 20 in the rake receiver 10 according to the present invention. The rake finger 20 comprises a down-sampler 30, receiving down-sampling information DSI from the channel estimator 11, instructing the down-sampler 11 which samples are to be removed from the input sample stream sI(nTs) and sQ(nTs), so as to select multipath components with a sub-chip resolution. The rake finger 20 further comprises a data de-spreader 31, a local pseudo-noise reference generator 32, a phase estimator 33, and a coherent combiner 34, outputs of the data de-spreader 33 and the phase estimator 33 being coherently combined in the coherent combiner 34. Such a coherent combination implies that sub-chip resolved multipath components are combined in the single rake finger 20 such that no destructive addition occurs. In order to coherently combine sub-chip resolved multipath components, the phase estimator 33 estimates a combined phase of the sub-chip-resolved multipaths allocated to the rake finger 20.

Figure 4:
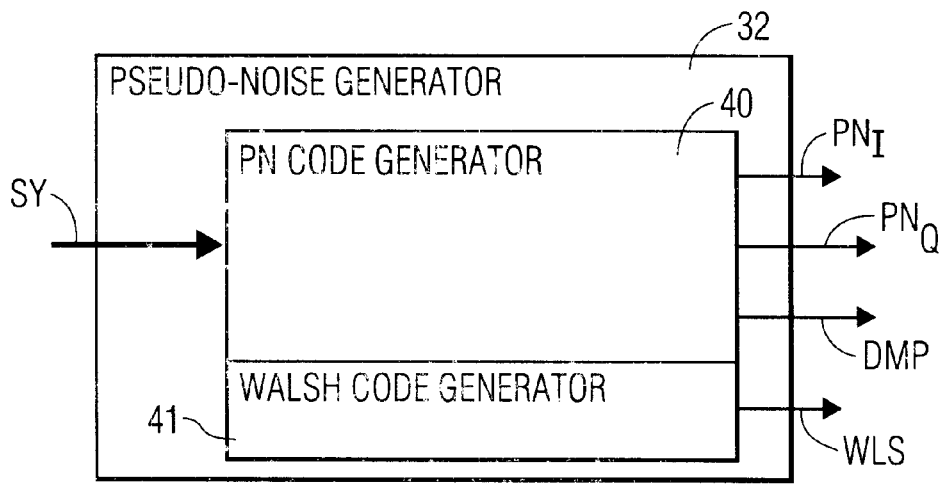
FIG. 4 depicts a pseudo-noise generator for use in a rake receiver according to the present invention.

FIG. 4 depicts the pseudo-noise generator 32 for use in rake fingers of the rake receiver 10 according to the present invention. The pseudo-noise generator 32 comprises a pseudo noise code generator 40 providing in-phase and quadrature pseudo noise codes $PN_I$ and $PN_Q$, and a Walsh code generator 41 providing a so-called Walsh code WLS. The pseudo-noise generator 32 further provides a dump signal DMP for controlling reading out of the data de-spreader 31 and the phase estimator 33. The pseudo-noise generator 32 is synchronized by the channel estimator 11 so as to synchronize the locally generated pseudo-noise reference sequence to the pseudo-noise reference sequence in the received signal, intended for the rake receiver 10. In the example given the rake receiver 10 can process signals generated in a narrow-band DSSS CDMA system, such as said IS-95-system. In said IS-95-A system, the channel structure and spreading of the forward and reverse channel is very different. In case of an IS-95- system, the present invention only applies to the forward channel. On the basis of synchronization information SY, received from the channel estimator 11, in the rake receiver 10 multipaths can be resolved at a resolution of more than one chip. The pseudo-noise generator 32 can be easily adapted so that the rake receiver can process broad band DSSS CDMA signals, as will be readily recognized by a person skilled in the art.

Figure 5:
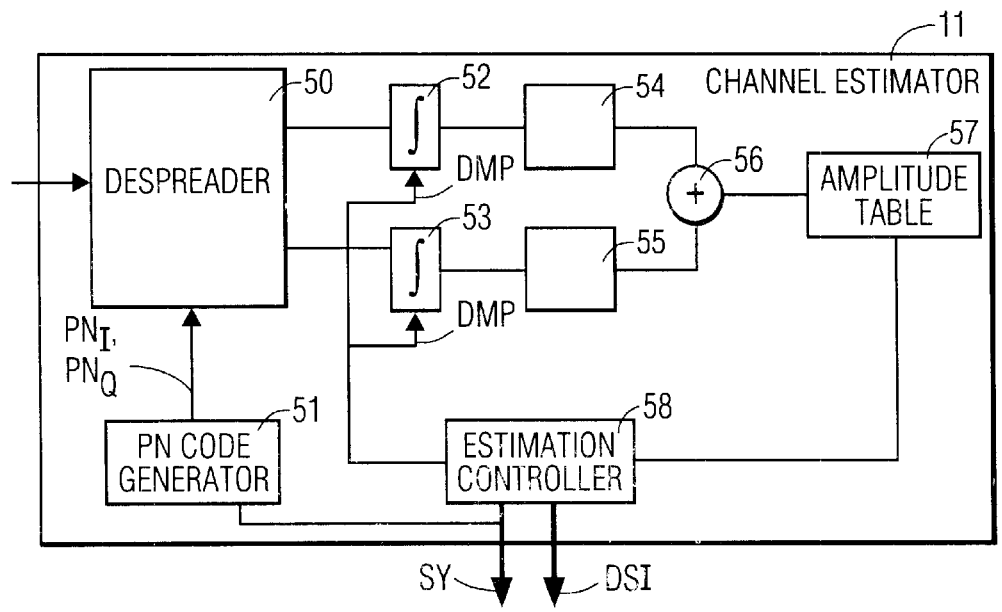
FIG. 5 is a block diagram of a channel estimator for use in a spread spectrum communication device according to the present invention.

FIG. 5 is a block diagram of the channel estimator 11 for use in the spread spectrum communication device 1 according to the present invention. The channel estimator 11 comprises a de-spreader spreader 50, and a PN-Code Generator as 51, similar to the PN-Code generator 40 as shown in FIG. 4, controlling the de-spreader 50 such that only a received signal intended for the rake receiver 10 causes correlation peaks at the output of the de-spreader 50. After de-spreading, quadrature de-spread signals of the received signal are integrated in respective integrators 52 and 53, and integrated samples are squared in respective squaring devices 54 and 55 and added in an adder 56. The de-spread and subsequently added samples are stored in an amplitude table 57, in the form of signal amplitudes as a function of a phase of the PN-Code sequence, at a sub-chip resolution. In case of an IS-95-A system, the PN-Code phase is resolved at a resolution of $1/(2^{15}$ times an oversampling factor of the sampling means 9). The estimation controller 58 also controls the phase of the PN Code generator 51, and the integration periods of the integrators 52 and 53, by the control signal DMP that determines dumping and resetting of the integrators 52 and 53. The estimation controller 58 controls the PN-Code generator 51 such that the amplitude table is continuously updated. The estimation controller 11 analyzes the amplitude table 57 in that maximums are searched at sub-chip resolution and at a resolution of more than one chip, and controls the rake fingers accordingly.

Figure 6:
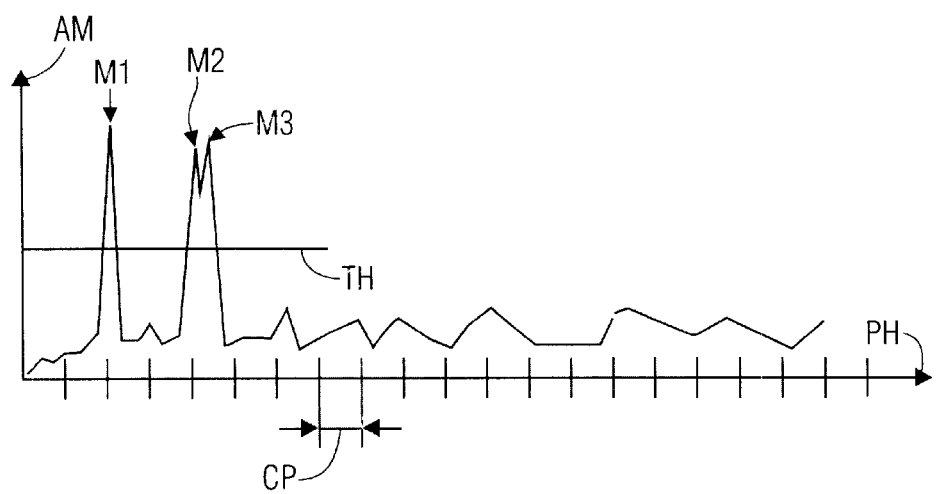
FIG. 6 is a graphical representation of sub-chip resolved multipath components in a spread spectrum communication device according to the present invention.

FIG. 6 is a graphical representation of sub-chip resolved multipath components in the spread spectrum communication device 1 according to the present invention. The graphical representation depicts the information stored in the amplitude table 57, amplitudes AM of de-spread, integrated, and dumped samples being plotted against phases PH of the PN Code generator 51, at a scale of one chip CP. As can be seen in FIG. 6, at a given point in time, above a threshold TH, three maximums are resolved in the receive signal, a single maximum M1, and at sub-chip resolution, two local maximums M2 and M3, the maximum M1 being spaced apart from the local maximums M2 and M3 more than one chip. The estimation controller 58 controls the rake fingers such that the maximum M1 is processed by one rake finger, and that the maximums M2 and M3 are processed by another rake finger. Maximums spaced apart more than one chip period are distinguished in synchronization information to be supplied to the PN-generators in the rake fingers, whereas local maximums at sub-chip resolution are distinguished in down-sampling information to be supplied to down-samplers in the rake fingers.

Figure 7:
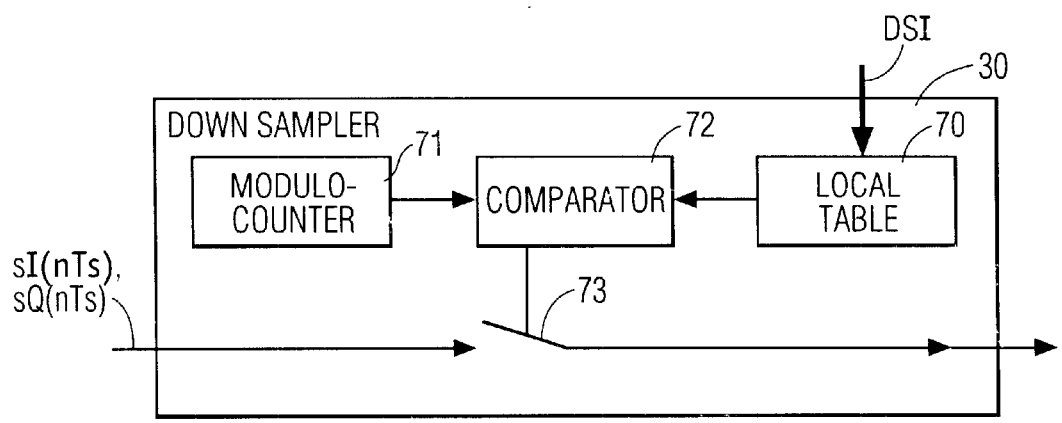
FIG. 7 is an embodiment of a down sampler for use in a rake finger of a rake receiver according to the present invention.

FIG. 7 is an embodiment of the down-sampler 30 for use in the rake finger 20 of the rake receiver 10 according to the present invention, and in the other rake fingers 21 and 22. The down-sampler 30 receives the input sample stream sI(nTs) and sQ(nTs) from the sampling means 9, and the down-sampling information DSI from the channel estimator 11 so as to command the down-sampler 30 which samples to process. The down-sampler 30 comprises a local table 70 for storing sample numbers that should be processed, the local table 70 continuously being updated by the channel estimator 11. The down-sampler 30 further comprises a modulo-counter 71 and a comparator 72, the comparator 72 comparing an output of the modulo-counter 71 with sample number entries in the local table 70. The comparator 72 controls a switch 73. The switch 73 is closed when a modulo-counter count value corresponds with an entry in the local table 70, thereby passing through samples in the input data stream sI(nTs) and sQ(nTs) to the data de-spreader 31 and the phase estimator 33. The modulo-counter 71 cyclically counts at the number of samples per chip, i.e., at the sub-chip resolution.

Figure 8:
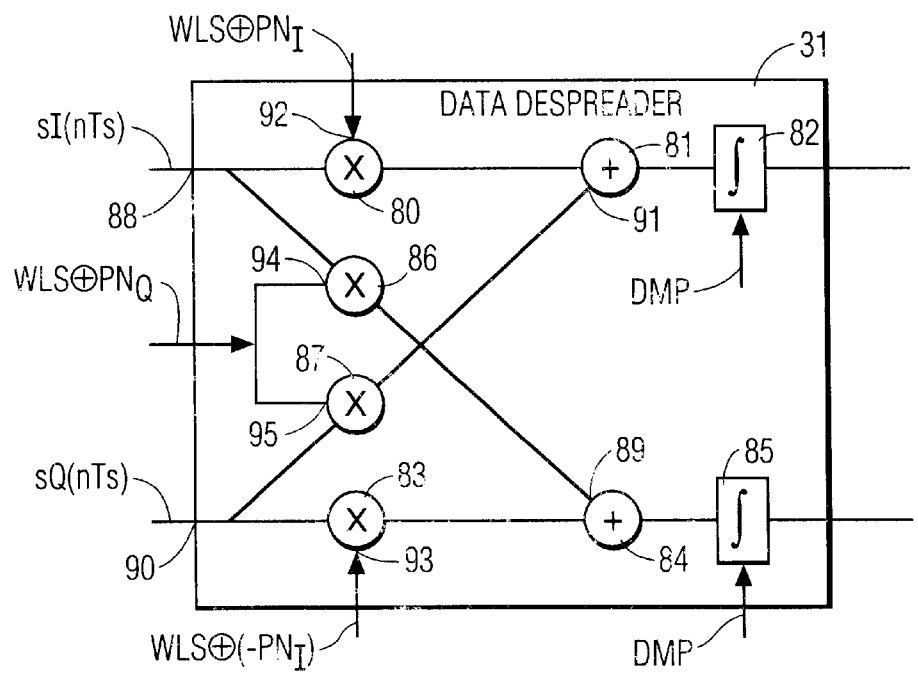
FIG. 8 shows a de-spreader for use in a spread spectrum communication device according to the present invention.

FIG. 8 shows the data de-spreader 31 for use in the spread spectrum communication device 1 according to the present invention. The data de-spreader 31 is a quadrature signal de-spreader comprising an in-phase branch of a first multiplier 80, a first combiner 81, and a first integration and dump device 82, and a quadrature branch of a second multiplier 83, a second combiner 84, and a second integration and dump device 85. The data de-spreader 31 further comprises a third multiplier 86 and a fourth multiplier 87, the third multiplier 86 being cross coupled between an in-phase input 88 of the data de-spreader 31 and an input 89 of the second combiner 84, and the fourth multiplier 87 being cross-coupled between a quadrature input 90 of the data-de-spreader 31 and an input 91 of the first combiner 81. A modulo-2 added combination of the Walsh sequence WLS and the in-phase pseudo-noise sequence $PN_I$, $WLS \oplus PN_I$, is supplied to an input 92 of the first multiplier 80, a modulo-2 added combination of the Walsh sequence WLS and an inverted version of the in-phase pseudo-noise sequence $PN_I$, $WLS \oplus (-PN_I)$, is supplied to an input 93 of the second multiplier 83, and a modulo-2 added combination of the Walsh sequence WLS and the quadrature pseudo-noise sequence $PN_Q$, $WLS \oplus PN_Q$, is supplied to inputs 94 and 95 of the respective third and fourth multipliers 86 and 87, $\oplus$ denoting a modulo-2 addition, i.e., an Exclusive-OR operation. The de-spreader 50 as of the channel estimator 11 in FIG. 5 has a similar structure, but only in the data de-spreader 31 a Walsh code is used in addition to the PN Code sequences $PN_I$ and $PN_Q$ in order to select a code channel as defined in said TIA/EIA IS-95-A Standard. In the de-spreader 31, multiplied data are added over a symbol period of symbols to be detected by the symbol detector 12. With the control signal DMP, the pseudo-noise generator 32 signals the start and end of a symbol period.

Figure 9:
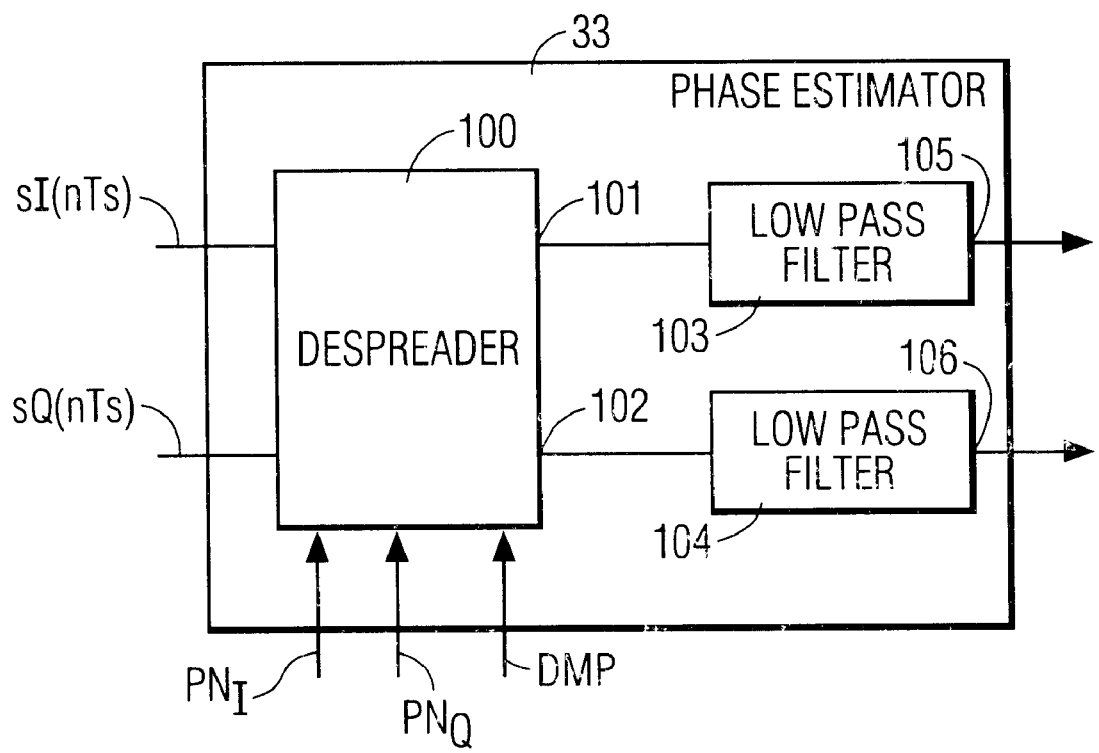
FIG. 9 is a block diagram of a phase estimator for use in a rake finger of a rake receiver according to the present invention.

FIG. 9 is a block diagram of the phase estimator 33 for use in a rake finger of the rake receiver 10 according to the present invention. The phase estimator 33 comprises a de-spreader 100 of a similar structure of the de-spreader 50, respective outputs 101 and 102 of the de-spreader 100 being coupled to respective low pass filters 103 and 104. At respective outputs 105 and 106 of the low filters 103 and 104 respective phase estimates of data samples in the in-phase and quadrature branches are available. The low pass filters 103 and 104 are used for interpolating de-spread signals at the respective outputs 101 and 102 in order to reduce noise in the estimated signal. Herewith, de-spread and filtered signals at the outputs 105 and 106 are added phase signals of the sub-chip resolved multipath components. As a result, a rake finger demodulating two or more sub-chip resolved multipath components effectively coherently adds estimates of such multipath components.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:
1. A spread spectrum communication device for use in a direct sequence spread spectrum, code division multiple access system, wherein a symbol is spread by a pseudo-noise reference sequence with a chip rate which is substantially greater than a symbol rate of said symbol, so as to form a spread spectrum signal, said spread spectrum signal being modulated onto a carrier and being transmitted over an air interface tending to produce multipath components of said modulated spread spectrum signal, said spread spectrum communication device comprising:

a receiver front-end means for receiving said modulated spread spectrum signal;
  a carrier demodulation means for demodulating said received modulated spread spectrum signal;
  a sampling means for obtaining samples from said demodulated spread spectrum signal, said sampling means having a sampling rate exceeding said chip rate;
  a channel estimator for estimating from said samples, with a sub-chip resolution, channel characteristics of said multipath components, and for determining local maximums in said channels characteristics, and, within a chip period, sample locations corresponding to said local maximums;
  a rake receiver, said rake receiver being coupled to said channel estimator, receiving said samples, and comprising a plurality of receiver branches, each of said receiver branches comprising:
    a down-sampler for sampling down said samples, on the basis of said determined sample locations, and
    a correlation means for correlating said down-sampled samples with a locally generated pseudo-noise reference sequence so as to generate correlation values;
  said rake receiver further comprising:
    combining means for diversity combining said correlation values; and,
  said spread spectrum communication device further comprising:
    decision means for deciding about a received symbol value, on the basis of said diversity combined correlation values.

2. A spread spectrum communication device as claimed in claim 1, comprising power control means for independently controlling powering of said receiver branches, said power control means being coupled to said channel estimator, and switching off power to receiver branches for which no local maximums were determined by the channel estimator.

3. A spread spectrum communication device as claimed in claim 1, wherein said down-sampler comprises a controllable switching means coupled between an input of said receiver branch and said correlation means, a storage means for storing an ordered list of sample numbers received from said channel estimator, modulo counter means for modulo counting a number of samples per chip, and comparator means coupled between said modulo counter means and said storage means, said comparator means commanding said controllable switching means to cyclically close when count values of the modulo counter means match a stored sample number.

4. A spread spectrum communication device as claimed in claim 1, wherein said correlation means comprises a first de-spreader and a multiplier, said first de-spreader being coupled between said down-sampler and a first input of said multiplier, and wherein said correlation means further comprises a phase estimator coupled between an input of said first de-spreader and a second input of said multiplier, said phase estimator further being coupled with a PN-generator comprised in said receiver branch, and said PN-generator providing said locally generated pseudo-noise reference sequence.

5. A spread spectrum communication device as claimed in claim 4, wherein, within said chip period, said phase estimator determines a combined phase of said multipath components; said combined phase being used for coherent combining with output signals of said de-spreader.

6. A spread spectrum communication device as claimed in claim 4, wherein said channel estimator provides information to said PN-generator so as to select multipath components with a resolution of more than one chip period.

7. A spread spectrum communication device as claimed in claim 4, wherein said phase estimator comprises a second de-spreader to which quadrature components of said down-samples are supplied, and a first filter coupled to a first output of said second de-spreader for providing an in-phase phase estimate, and a second filter coupled to a second output of said second de-spreader for providing a quadrature phase estimate, said second de-spreader having further inputs which are coupled to in-phase and quadrature output of said PN-generator, and to a symbol synchronization input, respectively.

8. A spread spectrum communication device as claimed in claim 4, wherein the first de-spreader is a quadrature de-spreader comprising an in-phase branch of a first multiplier, a first combiner, and a first integration and dump device, and a quadrature branch of a second multiplier, a second combiner, and a second integration and dump device, and further a third multiplier cross-coupled between an in-phase input and an input of said second combiner, and a fourth multiplier cross-coupled between a quadrature input and an input of said first combiner, wherein a modulo-2 added combination of a Walsh sequence and an in-phase pseudo-noise sequence is supplied to an input of said first multiplier, a modulo-2 added combination of said Walsh sequence and an inverted version of said in-phase pseudo-noise sequence is supplied to an input of said second multiplier, and a modulo-2 combination of said Walsh sequence and a quadrature pseudo-noise sequence is supplied to coupled inputs of said third and fourth multipliers.

9. A spread spectrum communication device as claimed in claim 1, wherein said channel estimator derives synchronization information from said received spread spectrum signal and synchronizes said locally generated pseudo-noise reference sequence, said synchronization information being related to multipaths separated by more than one chip period.

10. A receiving method for use in a direct sequence spread spectrum, code division multiple access system, in which system a symbol is spread by a pseudo-noise reference sequence with a chip rate which is substantially greater than a symbol rate of said symbol, so as to form a spread spectrum signal, and said spread spectrum signal is modulated onto a carrier and is transmitted over an air interface tending to produce multipath components of said modulated spread spectrum signal, said receiving method comprising:

receiving said modulated spread spectrum signal;
  demodulating said received modulated spread spectrum signal;
  sampling said demodulated spread spectrum signal at a sampling rate exceeding said chip rate, so as to obtain samples;
  estimating from said samples, with a sub-chip resolution, channel characteristics of said multipath components, and determining local maximums in said channel characteristics, and, within a chip period, determining sample locations corresponding to said local maximums;

said receiving method further comprising:
  down-sampling said samples, on the basis of said determined sample locations, and
  correlating said down-sampled samples with a pseudo-noise reference sequence, thereby generating correlation values; and said receiving method still further comprising:
  diversity combining said correlation values; and
  deciding about a received symbol value, on the basis of said diversity combined correlation values.

* * * * *